United States Patent Office 3,415,857
Patented Dec. 10, 1968

3,415,857
PRODUCTION OF ORGANOTIN HALIDES
Peter Albert Theodore Hoye, Kinver, Stourbridge, England, assignor to Albright & Wilson Limited, Birmingham, England, a British company
No Drawing. Filed Sept. 17, 1965, Ser. No. 488,245
Claims priority, application Great Britain, Sept. 18, 1964, 38,241/64
10 Claims. (Cl. 260—429.7)

This invention relates to improvements in the production of organotin compounds.

The direct reaction of metallic tin with organic halides to produce organotin halides is one that has been carried out satisfactorily only in a few instances, such as using activated halides, for example benzyl chloride, or alkyl iodides. The reaction of metallic tin with alkyl iodides produces organotin iodides in good yield but is an expensive one to operate involving the use of the costly organic iodides and the economic necessity to recover all the iodine value for re-use. The ability to carry out the direct reaction of metallic tin with organic chlorides and bromides as a general reaction is a most desirable concept, but one that has not hitherto been satisfactorily attainable. Many compounds have been tested as catalysts for the reaction but these have not been found to give entirely satisfactory results, for instance, because they are not sufficiently general in their reaction, or give insufficient yield of the desired product or because the organotin product is contaminated with undesirable catalyst residues. We have also found that many compounds which have been stated to catalyze the direct reaction of alkyl iodides with metallic tin are substantially ineffective with the corresponding chlorides and bromides.

We have now found that the presence in the reaction mixture of an organic 'onium compound has a marked catalytic effect on the reaction of aliphatic chlorides or bromides with metallic tin. We have also surprisingly found that the initial presence in the reaction mixture of a preformed stannous or organotin chloride or bromide greatly increases the rate of the initial reaction and consequently reduces the overall reaction period required. The product of the reaction is a mixture of organotin halides in which the diorganotin dihalide predominates, a minor amount of organotin trihalide usually being produced concurrently. The product is readily separated from residual catalyst and this residual catalyst may be re-used in a further reaction between the aliphatic halide and metallic tin.

Accordingly, the present invention provides a process for the production of organotin halides which comprises reacting metallic tin or an alloy thereof with an aliphatic halide in which the halide moiety is selected from the group consisting of chloride and bromide, at a temperature of 50° C. to 250° C. and in the presence as catalyst of an organic 'onium compound.

The aliphatic halide which may be used in the instant invention is one in which a chlorine or bromine atom is linked to an aliphatic carbon atom. The aliphatic carbon atom may be part of an alkyl group, an aralkyl group or an alkenyl group of the allylic type. Preferred halides for present use are those having less than 20 carbon atoms, for example methyl, ethyl, propyl, butyl, hexyl and octyl chlorides and bromides, particularly those having 4 to 8 carbon atoms. There may also be employed allyl chloride, methallyl chloride and benzyl and nuclear-substituted benzyl chlorides and bromides. Though the reactivities of the bromides are greater, it is preferred to use the chlorides since these are much less expensive and it is a feature of the present invention that aliphatic chlorides may be employed in the production of organotin halides by the direct reaction therewith of metallic tin or alloys thereof.

The metallic tin may be powdered to increase its surface area or may be in the form of sheet or pieces of granulated metal. Alloys of tin may be used, particularly alloys containing those metals which may function as co-catalysts as described hereinafter.

The catalyst for present use comprises an 'onium compound which is herein defined as a compound containing organic groups covalently bonded to a positively-charged non-metallic atom from Groups V or VI of the Periodic Table. The preferred 'onium compounds are quarternary ammonium, phosphonium or sulphonium salts, particularly the halides. For example there may be employed such tetra-alkylammonium halides as tetra-n-butylammonium chloride or bromide, tetra-ethylammonium bromide or chloride; or tetra-n-octylammonium bromide; such tetra-alkylphosphonium salts as tetra-n-butylphosphonium bromide, tetraethylphosphonium bromide or tetra-octylphosphonium bromide; or such trialkylsulphonium compounds as diethyl octyl sulphonium bromide or tributylsulphonium bromide.

The 'onium compound is preferably preformed. However, if desired, it may be formed in situ by the inclusion in the reaction mixture of an amine or phosphine and the use of such conditions at the start of the reaction as will result in its quaternization with some of the aliphatic halide present to yield the desired quaternary ammonium or phosphonium halide.

The organic groups present in the catalyst are preferably identical to that of the aliphatic halide reactant since the reaction appears to involve intermediate reaction with the catalyst and the organotin product may then comprise some compounds having bonded to the tin atom an organic group present initially in the catalyst.

It is preferred to have present initially in the reaction mixture a preformed tin chloride or bromide which is a stannous halide or organotin halide since this increases the rate of the initial reaction and therefore reduces the time required for the overall reaction. This can be conveniently achieved by recycling continuously or batch-wise a little of the organotin halide product to the initial reaction. Alternatively, where the product is removed from the residual catalyst by distillation and such residual catalyst re-used, it is convenient to interrupt the distillation shortly before completion so that some of the product remains associated with the catalyst when it is subsequently re-used. The nature of such organotin halide is not critical but preferably when employed it should be identical with the organotin halide to be produced in the process of the invention, particularly a dialkyltin dihalide.

It is believed that the active catalyst in the present reaction may be a complex formed between the 'onium compound and a stannous or organotin halide, that is a compound in which the 'onium cation is associated with an anion of the formula $SnX_3^-$ or $R_aSnX^-_{5-a}$ (wherein X is a chlorine or bromine atom, R is an organic group and $a$ is 1, 2 or 3); such complexes are, of course, still 'onium compounds within the definition stated hereinbefore. In the absence of a preformed stannous or organotin chloride or bromide, such halide may be formed by an initial reaction or as a by-product of the main reaction. However, such formation could well be slow and thus account for the initial slowness of the process if the tin halide is not initially present.

Preferably the halide atoms of the aliphatic halide, 'onium salt and stannous or organotin halide are all identical, but this is not essential and mixtures find particular use when the less reactive aliphatic chlorides are employed, often in admixture with a minor amount of the corresponding aliphatic bromide.

The aliphatic halide is normally used in excess of the two molecular proportions theoretically necessary for the formation of diorganotin dihalides, the excess being readily recoverable. The use of appreciable quantities of the catalyst is preferred, but this is not disadvantageous as the residual catalyst is readily recovered and may then be re-used. Normally the 'onium compound is present in an amount of from 0.1 to 0.6, preferably 0.2 to 0.5, molecular proportions per atomic proportion of tin employed. The stannous or organotin halide is preferably added in substantially equimolecular proportion to the 'onium compound.

If desired, a further co-catalyst may be present. This may be a small amount of metallic magnesium, zinc, cadmium, mercury, copper, cobalt, nickel, aluminium, titanium, manganese, iron, calcium, chromium or a compound of such a metal, particularly a salt, alkoxide or mercaptide thereof. The co-catalyst may be employed in an amount up to about 0.1 mole per mole of metallic tin present.

The process of the invention is carried out by heating the tin, aliphatic halide and 'onium catalyst together at temperatures of 50° C. to 250° C., preferably at 100° C. to 200° C. It is often convenient to carry out the reaction under reflux conditions. Superatmospheric pressure may be used, if desired, and it is then convenient to carry out the reaction in a pressure vessel under autogenous pressure. The aliphatic halide is preferably present in considerable stoichiometric excess, preferably about 4 to 5 times the theoretical quantity. The reaction is usually continued until all the tin has dissolved and this may take up to 100 hours. However after completion, or even if the reaction is stopped prematurely, the excess aliphatic halide and any unreacted tin are readily recovered from the reaction mixture for re-use, for example by distillation and filtration respectively.

Though the reactants and catalyst are usually merely heated together with an excess of the aliphatic halide providing the desired reaction medium, an additional liquid diluent may be present if desired. Suitable diluents are those which act as inert solvents for the aliphatic halide and include aliphatic ethers or cyclic ethers, for example diethyl ether, dibutyl ether, tetrahydrofuran, ethylene glycol dimethyl ether, ethylene glycol diethyl ether or diethylene glycol dimethyl ether, or liquid hydrocarbons such as hexane, iso-octane, benzene, toluene or xylene.

We have also shown that diluents containing hydroxy groups may be employed, such as for instance alcohols, phenols and ether alcohols such as alkoxy-alkanols and monoalkyl ethers of diethylene glycol, though such active solvents should not be used in too great amount as they have a tendency to undergo condensation reactions with the aliphatic halide or the organotin halide product. However, the presence of small amounts of such active solvents, for instance up to 0.5 mole of tin, also appears to have a catalytic effect on the process of the invention.

After the reaction any residual metallic tin is removed by filtration, centrifuging or decantation and the organotin halide product separated by distillation, usually under reduced pressure, excess aliphatic halide normally being recovered as a first fraction. The involatile residue is the catalyst and we have shown that this may be re-used for a very large number of successive reactions without loss of catalytic activity, particularly when it is arranged that this contains an adequate amount of organotin halide.

The organotin distillate fraction obtained consists substantially of a mixture of di- and mono-organotin halides and this may be used as such, for example in a redistribution or disproportionation reaction or hydrolysed by aqueous alkali to produce a diorganotin oxide which is insoluble in the alkali and an organostannoic acid soluble in the alkali. Usually the mixture comprises 70–90% of diorganotin dihalide.

The process of the invention may also be used to prepare dialkyltin dihalides in which the alkyl groups are dissimilar. This object is most easily achieved by reacting the tin and aliphatic halide in the presence also of an alkyltin trihalide, preferably in substantially equimolecular proportion to the tin reactant.

The resulting organotin compounds, either the halides or their hydrolysis products, are valuable intermediates for the production of other organotin compounds which are finding increasing commercial use as stabilizers for synthetic polymeric materials, herbicides and fungicides and as catalyst for the production of foamed polyurethane resins.

The invention is illustrated by the following examples in which all quantities are expressed on a weight basis.

Example 1

A mixture of tin sheet (103 parts; 0.95 mole), n-butyl bromide (450 parts; 3.28 moles), stannous bromide (70 parts, 0.25 mole) and tetra-n-butyl-ammonium bromide (80.5 parts, 0.25 mole) was heated to reflux. The stannous bromide rapidly dissolved while the tin metal dissolved slowly becoming coated with a grey deposit. After 55 hours the metal and deposit had completely dissolved. The mixture was then distilled under reduced pressure to an internal temperature of 195° C. at 0.5 mm. mercury to remove successive fractions of excess butyl bromide and a mixture of butyltin bromides (330 parts) (98.4% yield based on the tin metal), which by analysis was shown to consist of 85% dibutyl tin dibromide and 15% butyltin tribromide. There remained a catalyst residue (177 parts).

Example 2

The method of Example 1 was repeated using a mixture of tin sheet (60 parts, 0.54 mole), n-butyl bromide (250 parts, 1.63 moles), stannous bromide (23.3 parts, 0.08 mole) and tetra-n-butylphosphonium bromide (28.2 parts, 0.08 mole); a reaction time of 40 hours was required. Distillation of the reaction mixture under reduced pressure yielded excess butyl bromide (102.5 parts), a mixture consisting of 86% of dibutyltin dibromide and 14% of butyltin tribromide (207 parts) (Found: Sn, 29.9; Br, 42.9; C, 23.0; H, 4.8; P, 0.03%) and a catalyst residue (56 parts).

Example 3

Tin sheet (119 parts, 1 mole), n-butyl bromide (443 parts, 3.23 moles) and tetra-n-butylammonium bromide (161 parts, 0.5 mole) were heated under reflux for 60 hours during which all the tin dissolved. It is to be noted that the total time of reaction was much longer than in the previous examples when a preformed stannous halide was present initially.

On distillation under reduced pressure there was obtained excess butyl bromide (213.5 parts), a mixture of butyltin bromides (207.5 parts), shown by thin layer chromatography to be a mixture of 53% of tributyltin bromide and 47% of dibutyltin dibromide (Found: Sn, 29.6; Br, 29.7; N, 0.34%), and a catalyst residue (297 parts) believed to be crude $Bu_4N.SnBr_3$ (Found: C, 29.0; Br, 38.7; N, 2.5; Sn, 19.2%). Thus the reaction proceeded substantially according to the equation:

$$3BuBr + Bu_4NBr + 2Sn = Bu_3SnBr + Bu_4N.SnBr_3$$

Example 4

A mixture of tetrabutylammonium bromide (161 parts, 0.5 mole), butyltin trichloride (141 parts, 0.5 mole), tin (59.5 parts, 0.5 mole) and octyl chloride (350 parts, 2.35 mole) was heated under reflux for 20 hours during which all the tin reacted. Distillation of the mixture yielded a small amount of unchanged butyltin trichloride, a fraction (B.P. 122° C./0.2 mm. pressure) consisting largely of butyltin and octyltin halides, a fraction (B.P. 180–190° C./0.2 mm. pressure) of dioctyltin halides and a catalyst residue. The total distillate (188 parts) was shown by thin layer chromatography to consist of a mixture of dibutyltin, butyloctyltin and dioctyltin dihalides.

Example 5

Octyltrimethylammonium bromide (52 parts, 0.14 mole), stannous bromide (40 parts, 0.2 mole), tin sheet (134.5 parts, 1.113 moles), butyl bromide (206 parts, 1.5 moles) and dibutyltin dibromide (256 parts, 0.65 mole) were mixed and heated to reflux. The initial reflux temperature was 119° C., but this rose steadily to 130° C. during four hours and as the tin commenced reaction. Thereafter the reflux temperature was maintained for 17 hours at 130–135° C. by suitable addition of butyl bromide. Distillation of the product yielded a mixture (641.5 parts) of 98% dibutyltin dibromide and 2% butyltin tribromide (Found: Sn, 30.4; Br, 41.4%).

Example 6

Tin foil (59.5 parts), butoxy-ethyl bromide (280 parts), tetrabutylammonium bromide (32.2 parts) and stannous bromide (27.9 parts) were mixed and heated to reflux for 14 hours whereupon all the tin had dissolved. Distillation gave unreacted butoxy-ethyl bromide, a fraction consisting of mono- and di-butoxyethyltin bromides (196 parts) and a catalyst residue.

Example 7

Octyl bromide (386 parts), tetrabutylammonium bromide (48.3 parts) and stannous bromide (48.3 parts) were mixed and heated to form a homogeneous solution. Tin foil (59.5 parts) was added and the reactants heated to 180° C. for 3 hours whereupon all the tin had reacted. Distillation to a pot temperature of 220° C. under 1 mm. pressure gave recovered octyl bromide (203 parts), a mixture (195 parts) consisting largely of dioctyltin dibromide mixed with a little octyltin tribromide and a catalyst residue (128 parts).

To the catalyst residue were added tin metal (59.5 parts) and octyl bromide (386 parts) and the mixture heated at 180° C. for 5 hours whereupon all the tin had reacted. Distillation of the mixture gave a further quantity of octytin bromides (198 parts) and a catalyst residue (179 parts). On hydrolysis of this residue by addition of aqueous alkali there was obtained a water-insoluble mixture of octyltin chlorides (tin content 47.5 parts) shown to be predominantly trioctyltin oxide and an aqueous solution which contained 16.9 parts of stannous tin.

Example 8

A mixture of octyl chloride (297 parts), stannous bromide (41.9 parts), tetrabutylammonium bromide (48.3 parts), tin sheet (50 parts) and xylene (225 parts) were heated at reflux for 24 hours to dissolve all the tin. Xylene and unreacted octyl chloride were distilled off and further distillation at 200° C./1 mm. gave a mixture of mono- and di-octyltin chlorobromides (149.9 parts). The residue (112.4 parts) was shown to contain trioctyltin halides and a little dioctyltin dihalides.

Example 9

Cetyltrimethylammonium bromide (52 parts) and stannous bromide (40 parts) were mixed and warmed in n-butyl bromide (206 parts) to form the complex salt. Dibutyltin dibromide (256 parts) and tin (134.5 parts) were added and the mixture heated at reflux for 3 hours, further butyl bromide being added after 2½ hours as required to keep the reflux temperature at 130–138° C. Complete reaction of tin occurred in 17 hours and distillation gave excess butyl bromide and a mixture of organotin bromides (641.5 parts) which was largely dibutyltin dibromide.

Example 10

A mixture of butyl chloride (185 parts, 2.0 moles), tetrabutylammonium bromide (50 parts, 0.15 mole) and tin foil (50 parts, 0.41 mole) was heated under autogenous pressure in a rocking autoclave at 150° C. for 12 hours. Unreacted tin (14.8 parts) was separated from the product which was then stripped of butyl chloride by heating to 120° C. Distillation under reduced pressure to a pot temperature of 200° C./14 mm. pressure gave a mixture (35.4 parts) of 64% butyltin trichloride and 36% dibutyltin dichloride (Found: Sn, 32.8; Cl, 13.3%) and a catalyst residue (84.9 parts) which analysis suggested contained 79.5 parts of the 'onium complex $Bu_4NBr.SnCl_3$ 

The experiment was repeated using this catalyst residue, tin sheet (50 parts) and butyl chloride (185 parts). All the tin reacted and after working up as before there was obtained a mixture (89.9 parts) of 87% dibutyltin dichloride and 13% of butyltin trichloride together with a catalyst residue.

Example 11

A mixture of butyl chloride (185 parts, 2.0 moles), tetrabutylammonium bromide (50 parts, 0.15 mole) and tin foil (50 parts, 0.41 mole) was heated under autogenous pressure in a rocking autoclave at 150° C. for 12 hours. Unreacted tin (14.8 parts) was separated from the product which was then stripped of butyl chloride by heating to 120° C. Distillation under reduced pressure to a pot temperature of 200° C./14 mm. pressure gave a mixture (35.4 parts) of 64% butyltin trichloride and 36% dibutyltin dichloride (Found: Sn, 32.8; Cl, 13.3%) and a catalyst residue (84.9 parts) which analysis suggested contained 79.5 parts of the 'onium complex $Bu_4NBr.SnCl_3$ 

The experiment was repeated using this catalyst residue, tin sheet (50 parts) and butyl chloride (185 parts). All the tin reacted and after working up as before there was obtained a mixture (89.9 parts) of 87% dibutyltin dichloride and 13% of butyltin trichloride together with a catalyst residue.

I claim:
1. A process for producing aliphatic tin halides which comprises reacting at 50° C.–250° C. metallic tin with an aliphatic halide having less than 20 carbon atoms in which the halide moiety is selected from the group consisting of chloride and bromide, in the presence of (1) a catalyst consisting essentially of an 'onium compound containing covalently bonded organic groups, said 'onium compound being selected from the group consisting of quaternary ammonium and quaternary phosphonium chloride and bromides, (2) 0–0.1 mole per mole of metallic tin of a member selected from the group consisting of metallic magnesium, zinc, cadmium, mercury, copper, cobalt, nickel, aluminum, titanium, manganese, iron, calcium, chromium, a salt of the foregoing metals, an alkoxide of the foregoing metals, and a mercaptide of the foregoing metals, and (3) 0.1–0.6 mole per mole of metallic tin of a preformed tin halide selected from the group consisting of stannous chloride, stannous bromide, organotin chlorides and organotin bromides; and separating aliphatic tin halide thereby produced from said catalyst.

2. A process for producing aliphatic tin halides as claimed in claim 1 wherein 0.1–0.6 mole of 'onium compound is present per mole of metallic tin.

3. A process for producing aliphatic tin halides as claimed in claim 1 wherein said 'onium compound is a tetra-alkylammonium halide.

4. A process for producing aliphatic tin halides as claimed in claim 1 wherein said 'onium compound is a tetra-alkylphosphonium halide.

5. A process for producing aliphatic tin halides as claimed in claim 1 wherein said 'onium compound is a tetra-butylammonium bromide.

6. A process for producing aliphatic tin halides as claimed in claim 1 wherein at least 2 moles of aliphatic halide are present per mole metallic tin.

7. A process for producing aliphatic tin halides as claimed in claim 1 wherein the reaction is carried out in an inert solvent.

8. A process according to claim 1 in which the catalyst and a residual portion of the aliphatic tin halide product from a first operation is employed in conducting the reaction in a succeeding operation.

9. A process for producing alkyltin halides which comprises heating to 50° C.–250° C. metallic tin and an alkyl halide having less than 20 carbon atoms in which the halide moiety is selected from the group consisting of chloride and bromide, in the presence of (1) catalyst consisting essentially of 0.1–0.6 mole per mole of metallic tin of 'onium compound containing co-valently bonded alkyl groups, said 'onium compound being selected from the group consisting of quaternary ammonium and quaternary phosphonium chlorides and bromides, 0–0.1 mole per mole of metallic tin of a member selected from the group consisting of metallic magnesium, zinc, cadmium, mercury, copper, cobalt, nickel, aluminum, titanium, manganese, iron, calcium, chromium, a salt of the foregoing metals, an alkoxide of the foregoing metals, and a mercaptide of the foregoing metals, and (3) 0.1–0.6 mole per mole of metallic tin of a preformed tin halide selected from the group consisting of stannous chloride, stannous bromide, organotin chlorides and organotin bromides; and separating alkyltin halide thereby produced from said catalyst.

10. The process of claim 9 wherein the alkyl groups of said alkyl halide and said 'onium compound are the same and the halide moiety of said 'onium compound is the same as the halide moiety of said alkyl halide.

References Cited

UNITED STATES PATENTS

| 2,852,543 | 9/1958 | Blitzer et al | 260—429.7 |
| 3,085,102 | 4/1963 | Yatagai et al | 260—429.7 |

FOREIGN PATENTS

| 25,664 | 2/1963 | Japan. |

TOBIAS E. LEVOW, *Primary Examiner.*

W. F. W. BELLAMY, *Assistant Examiner.*